US011195105B2

(12) United States Patent
Hanen et al.

(10) Patent No.: US 11,195,105 B2
(45) Date of Patent: Dec. 7, 2021

(54) METHOD AND APPARATUS FOR PREDICTING THE TEMPORAL COURSE OF A POWER REQUIREMENT IN A HOUSING DEVELOPMENT (71) Applicant: Evohaus GmbH, Karlsruhe (DE)

(72) Inventors: Heinze Hanen, Karlsruhe (DE); Frank Diedrich, Karlsruhe (DE); Valentin Bertsch, Karlsruhe (DE); Hannes Schwarz, Karlsruhe (DE)

(73) Assignee: EVOHAUS GMBH, Karlsruhe (DE)

( * ) Notice: Subject to any disclaimer, the term of this patent is extended or adjusted under 35 U.S.C. 154(b) by 821 days.

(21) Appl. No.: 15/324,428

(22) PCT Filed: Jul. 8, 2015

(86) PCT No.: PCT/EP2015/065588
§ 371 (c)(1),
(2) Date: Jan. 6, 2017

(87) PCT Pub. No.: WO2016/005441
PCT Pub. Date: Jan. 14, 2016

(65) Prior Publication Data
US 2017/0161623 A1 Jun. 8, 2017

(30) Foreign Application Priority Data
Jul. 8, 2014 (DE) ..................... 10 2014 010 117.7

(51) Int. Cl.
G06Q 50/06 (2012.01)
G06N 5/04 (2006.01)
G06Q 10/06 (2012.01)
(52) U.S. Cl.
CPC ............ G06N 5/04 (2013.01); G06Q 10/063 (2013.01); G06Q 50/06 (2013.01)

(58) Field of Classification Search
CPC ......... G06N 5/04; G06Q 10/063; G06Q 50/06
See application file for complete search history.

(56) References Cited

U.S. PATENT DOCUMENTS 5,479,358 A * 12/1995 Shimoda ............ G05D 23/1902
700/291
8,392,031 B2 * 3/2013 Krok ........................ H02J 3/00
700/291

(Continued)

FOREIGN PATENT DOCUMENTS

DE 102010025095 A1 2/2011
DE 102012103081 A1 10/2012

(Continued)

OTHER PUBLICATIONS

Markus Schwarz. Determination of annual efficiency and emission factors of small-scale biomass boiler. 2011. Central European Biomass Conference. (Year: 2011).*

(Continued)

Primary Examiner — Jason Lin
(74) Attorney, Agent, or Firm — Maginot, Moore & Beck, LLP (57) ABSTRACT A method and an apparatus are provided for predicting the temporal course of a power requirement in a housing development comprising a plurality of power consumers and a common power supply that is subject to a temporally variable tariff. A prediction of the power consumption of the housing development for a future time period is continuously updated, each prediction of the power consumption using data of detected load profiles of the housing development in the time period having, a current prediction for the future time period being calculated on the basis of a previous prediction and a previously detected load profile The predictions and the detected load profiles are assigned characteristic variables, the predictions of which are known and (Continued)

which have an influence on the load profiles, and a current prediction for the future time period being calculated on the basis of a previous prediction and a previously detected load profile, each having the same characteristic variables.

11 Claims, 6 Drawing Sheets

(56) References Cited

U.S. PATENT DOCUMENTS

| | | | |
|---|---|---|---|
| 9,244,444 B2* | 1/2016 | Carty | G05F 1/66 |
| 9,563,924 B2* | 2/2017 | Ghosh | G05B 13/048 |
| 2002/0019762 A1* | 2/2002 | Tomita | G06Q 10/06 |
| | | | 700/291 |
| 2011/0231028 A1* | 9/2011 | Ozog | G06Q 50/06 |
| | | | 700/291 |
| 2012/0095608 A1* | 4/2012 | Murakami | G06Q 30/0202 |
| | | | 700/291 |
| 2012/0209439 A1* | 8/2012 | Inoue | G06Q 10/04 |
| | | | 700/291 |
| 2012/0221158 A1* | 8/2012 | Krok | G06Q 10/04 |
| | | | 700/291 |
| 2012/0323386 A1* | 12/2012 | Ito | B60L 55/00 |
| | | | 700/291 |
| 2013/0060392 A1* | 3/2013 | Wang | H02J 3/28 |
| | | | 700/291 |
| 2014/0005849 A1* | 1/2014 | Sun | H02J 3/00 |
| | | | 700/291 |
| 2014/0129040 A1* | 5/2014 | Emadi | G06Q 50/06 |
| | | | 700/291 |
| 2014/0163756 A1* | 6/2014 | Idrees | G06Q 50/06 |
| | | | 700/291 |
| 2014/0222228 A1* | 8/2014 | Sawa | G06Q 50/06 |
| | | | 700/291 |
| 2014/0222237 A1* | 8/2014 | Hibiya | H02J 3/383 |
| | | | 700/295 |
| 2014/0324244 A1* | 10/2014 | Musunuri | G06N 20/00 |
| | | | 700/299 |
| 2014/0336960 A1* | 11/2014 | Haghighat-Kashani | G01R 21/133 |
| | | | 702/60 |
| 2016/0226250 A1* | 8/2016 | Fukubayashi | H02J 3/008 |

FOREIGN PATENT DOCUMENTS

| | | |
|---|---|---|
| DE | 102012105404 A1 | 12/2012 |
| JP | 10080062 A * | 3/1998 |

OTHER PUBLICATIONS

Machine Translation for JP 10080062 A, obtained Jan. 2021 (Year: 1998).*

* cited by examiner

METHOD AND APPARATUS FOR PREDICTING THE TEMPORAL COURSE OF A POWER REQUIREMENT IN A HOUSING DEVELOPMENT

This application is a 35 U.S.C 371 National Stage application of PCT/EP2015/065588, filed Jul. 8, 2015 and claiming priority to German Application No. DE 10 2014 010 117.7, filed on Jul. 8, 2014. The entire contents of the above-mentioned patent applications are incorporated herein by reference as part of the disclosure of this U.S. application.

TECHNICAL BACKGROUND

The present invention relates to a method and an apparatus for predicting the temporal course of a power requirement in a housing development comprising one or a plurality of housing units each comprising a plurality of power consumers, the housing development having a common power supply that is subject to a temporally variable tariff.

Methods and apparatuses are described for predicting the consumption of electrical energy in housing developments. Within the context of this specification, "housing developments" are understood to mean one or more housing units having a common power supply and power billing. Within the context of this specification, "housing developments" include residential districts, that is to say housing developments having spatially or legally separate housing units or groups of housing units that jointly use devices.

The object of the invention is that of making it possible to reduce power costs without having a negative impact on the daily routine and the way of life of the residents of the housing development.

DESCRIPTION OF THE PROBLEM

The power costs in housing developments are increasingly subject to temporally variable outside influences. This can result, for example, from the power being generated in a proportional manner by decentralised generation facilities that are present in the housing development or are at least close by. A decentralised generation facility of this kind can be a photovoltaic installation for example. Therefore, in the event that the decentrally generated power is used completely or at least in part in the housing development itself, the power costs for the residents of the housing development are made up of a decentrally generated portion and a portion taken from the public power grid.

The level of coverage indicates what portion of the power requirement is met by the on-site decentralised generation, i.e. photocurrent for example. The level of coverage can, in principle, assume a value of between 100% and 0%. In the case of the photovoltaic facility, for example, the level of coverage is 100% when, at a time of high solar radiation, the entire (predicted) power supply of the housing development is met by the photovoltaic facility. Accordingly, the level of coverage is 0% when the photovoltaic facility cannot make any contribution at all to covering the power requirement of the housing development, for example during darkness. Any value in between is possible, depending on the predicted generation and consumption.

The temporal variability of the power costs arises from the fact that the costs of one reference unit of self-generated photocurrent are generally different from those for centrally generated power that is taken from the public power grid. If the costs of photocurrent are lower than those for power from the public power grid, it is advantageous for the residents of the housing development to move as large as possible a proportion of their power supply to those time periods in which sufficient photocurrent is available.

Convenience when using particular electric domestic appliances is often not dependent on the exact time at which said appliances are operated. Rather, the convenience often depends only on a domestic appliance finishing a task by a specifically determined end time. There is often a period of time between the time of deciding that a task needs to be accomplished and the time by which this task has to be completed that is longer than the time that the domestic appliance requires as its operating time for accomplishing the task. In situations of this kind, it is possible to vary the operation period of the appliance within the window of time specified by the user. It is therefore advantageous for the residents of the housing development to determine the operating time point of electrical consumers in such a way that said consumers operate at times when the electricity tariff is as low as possible.

A problem of this kind is known as a load transfer. The problem is that of connecting electrical consumers in such a way that said consumers carry out the tasks expected of them while incurring the lowest possible energy costs. In order to permit an advantageous load transfer of this kind, the electricity prices in the time window that is relevant for operating the corresponding domestic appliance must be predictable, at least in an approximate manner.

Such an approximate prediction of a temporally variable electricity price is possible if both the decentralised generation for private consumption (e.g. photocurrent) and the overall consumption of the housing development can be predicted. In this case, it is possible to predict the level of coverage of the decentralised power relative to the demand, and thus the mixed price of the power that results from the combination of the purchase price from the grid and the price of the power generated decentrally for private consumption.

This applies provided that the price of mains power is known, which is generally the case for housing developments. Usually, the price of mains power is always the same, irrespective of the time. However, the invention also relates to the case in which the price of mains power is variable. Said price simply needs to be predictable. In this case, the future mixed price of the power is determined by combining the predicted future price of mains power and the photocurrent price, taking into account the predicted future level of coverage.

The problem addressed by the present invention is that of predicting the power consumption of housing developments.

PRIOR ART

Predicting the photocurrent generation is closely linked to the weather forecast. A method for predicting the photocurrent generation is provided by Meteoblue for example [the document "meteoblue_pointSOLAR_Controlled_Quality_EN" by meteoblue AG, Clarastrasse 2, CH 4058 Basel, dated 23 Jul. 2013].

DE 10 2011 051 074 A1 discloses a method for controlling energy use by taking into account a prediction of the future energy requirement of one or more energy consumers in a home network.

DE 10 2010 027 726 A1 discloses a system for predicting the electrical energy requirement. This system relates to predicting the energy requirement of motor vehicles on the basis of historic data (driving profile).

DE 19 853 347 A1 discloses a method for distributing energy in a power supply network. In this example, the future energy requirement is estimated on the basis of information provided by the consumers themselves relating to their desired power supply.

Methods for integrating the volatile feed-in of decentralised generation facilities using load transfer at the end client, taking the example of wind feed-in, can be found in [Borenstein, S.; Jaske, M.; Rosenfeld, A.: Dynamic Pricing, Advanced Metering and Demand Response in Electricity Markets; Berkeley 2002], in [Brauner, G.; Pöppl, G.; Tiefgraber, D.: Verbraucher als virtuelles Kraftwerk—Potentiale für Demand Side Management in Österreich im Hinblick auf die Integration von Windenergie (*Consumers as a virtual power station—potential for demand-side management in Austria in view of the integration of wind energy*); Vienna 2006] and [Klobasa, M.: Dynamische Simulation eines Lastmanagements und Integration von Windenergie in ein Elektrizitätsnetz (*Dynamic simulation of load management and integration of wind energy in an electricity network*); Stuttgart 2009]. These documents specify that a load transfer in the home can contribute to compensating for the volatile decentralised generation. The basis for the load transfer can be direct control by the energy supplier, but also indirect influencing of the load by means of tariff incentives. This is developed upon by methods for load management in the home in reaction to the volatilities of decentralised generation capacities, focussing in particular on indirect, incentive-based load management using tariff incentives, which methods can be found in [Kamper, A.: Dezentrales Lastmanagement zum Ausgleich kurzfristiger Abweichungen im Stromnetz (*Decentralised load management for compensating for short-term fluctuations in the power grid*); Diss., Karlsruhe 2010] and in [Hillemacher, L.; Jochem, P.; Fichtner, W.: Entscheidungsunterstützung beim Lastmanagement (*Decision-making support in load management*); in: Renatus, F.; Kunze, R.; Karschin, I.; Geldermann, J.; Fichtner, W. (Eds.): Entscheidungsunterstützung durch Operations Research im Energie-und Umweltbereich—Tagungsband des Workshops der GOR-Arbeitsgruppen "OR im Umweltschutz" und "Entscheidungstheorie und Praxis" am 01. und 02. Marz 2012 in Goslar (*Decision-making support by operations research in the field of energy and the environment—meeting transcript of the workshop held by the GOR working groups "OR in environmental protection" and "Decision-making theory and practice" on 1 and 2 Mar. 2012 in Goslar*), pages 21-39.; Aachen 2012]. The particular focus here is on indirect load management by domestic customers that uses tariff incentives to promote load transfer. All the methods set out above address the topic both from the viewpoint of the total energy system and in relation to a single household, but not from the viewpoint of a residential district having a distribution network within the district in addition to decentralised generation facilities belonging to the district.

It is possible to approximately predict the future power requirement of a housing development by using standard load profiles (which can be obtained, for example, from EON in the document "Normierte Standardlastprofile H0, L0-L2, G0-G6 für Hessen" (*Normalised standard load profile H0, L0-L2, G0-G6 for Hessen*), EON Mitte AG, Monteverdistraße 2, 34131 Kassel (2012)]. However, standard load profiles of this kind are not very specific to the individual situation of a housing development. Standard load profiles of this kind do not take account of the individual characteristics of a specific housing development, such as the individual way in which a housing development is equipped with electrical consumer appliances or the demographic make-up of the resident community.

DE 10 2012 105 404 A1 discloses systems and methods for predicting energy consumption which allow a usage prediction for a new usage region to be made on the basis of a measured local energy usage region profile and demographic information relating to a new usage region.

DE 10 2012 103 081 A1 discloses an optimised load management method for optimising a temporal course of consumption of electrical power by a group of different consumers in view of a supply of electrical power that comprises electrical power from at least one wind or solar power generator and power that is bidirectionally exchanged with an accumulator for electrical energy and/or a public power grid. Characteristic temporal courses of the electrical power consumption by the individual consumers are determined and a prediction is made for the temporal course of the supply of electrical power from the at least one power generator for a future time period. A plan for allocating electrical power to the consumers for the future time period is created on the basis thereof.

DE 10 2010 025 095 A1 discloses an apparatus and a method for monitoring consumption of resources, such as electricity, water, natural gas or district heat.

SOLUTION

The present invention provides a method for predicting the temporal course of a power requirement in a housing development comprising one or a plurality of housing units each comprising a plurality of power consumers, the housing development having a common power supply that is subject to a temporally variable tariff, according to claim 1, and a corresponding apparatus according to claim 14.

The respective dependent claims relate to preferred embodiments.

The inventors have identified that, the conditions described here, specifically that the electricity supplier's contracting partner is not individual housing units but rather an entire housing development, allow a prediction to be made that is improved compared with the prior art. This is achieved because, when there is a sufficiently large number of housing units within the housing development, fluctuations in the load profile of individual housing units have a less significant effect on the prediction quality for the overview of the housing development than is the case when units are considered individually. This makes it possible to make a prediction that can better reproduce conditions specific to the housing development than even regionally adjusted standard load profiles would be able to. Using all of the housing units means that a sufficiently accurate prediction quality can be expected. The inventors have identified that it is advantageous for the selection of the historic load profiles used for the prediction to be constantly updated and thus adjusted to changed conditions, such as the profile of the residents of the housing development. The inventors have further identified that a useful degree of freedom when making the prediction is the weighting of the historical data used according to the age thereof, and this degree of freedom can be optimised for the prediction method.

The invention described herein solves the problem of approximately predicting the power consumption for housing developments, while also taking account of the individual characteristics of a specific housing development. Said invention provides more precise predictions than predictions according to the prior art, and thus permits an improved load transfer and thus a greater reduction in the power costs in the residential development as it allows the residents to transfer electrical loads to times having lower power costs and to predict these times more accurately.

In this case, a distinguishing feature compared with previous approaches is that the housing development as a whole is taken into account, as well as individual households being considered. This makes a vital contribution not only to optimised operation of the power grid within the housing development, but also to the network stability of the public distribution network to which the housing development as a whole is connected.

DESCRIPTION AND EMBODIMENTS

Figure 1:
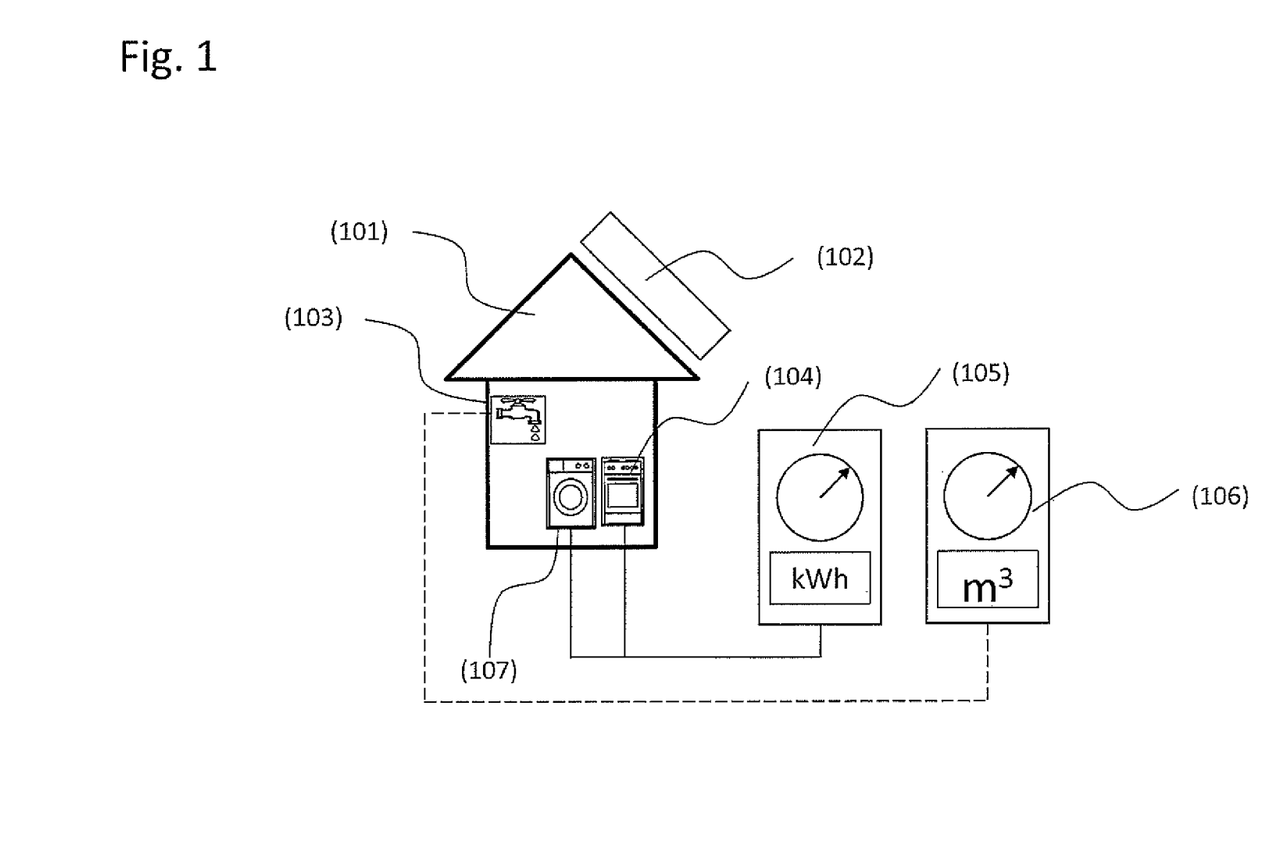
FIG. 1 shows a typical housing unit in a housing development.

The invention will be described in the following on the basis of the figures and specified by means of an embodiment. FIG. 1 shows a typical housing unit (101) in a housing development. One or more photovoltaic installations (102) are contained in the housing development. By way of example, the photovoltaic installations (102) can be on the roofs of the housing units. However, said installations can also be arranged at other locations in the housing development, for example on the roofs of carparks or in open-air regions.

The housing unit contains electrical consumers, for example a washing machine (107) and an oven (104). The electrical power consumption of the housing unit is measured by an electricity meter (105). The electricity meter (105) transmits the temporal course of the consumed power to a processor (501) via an appropriate interface and data input (502) (cf. FIG. 5).

The housing unit additionally contains water consumers (103). The water meter (106) transmits the temporal course of the consumed water of a housing unit to a processor (501) via an appropriate interface and data input (502) (cf. FIG. 5).

Figure 2:
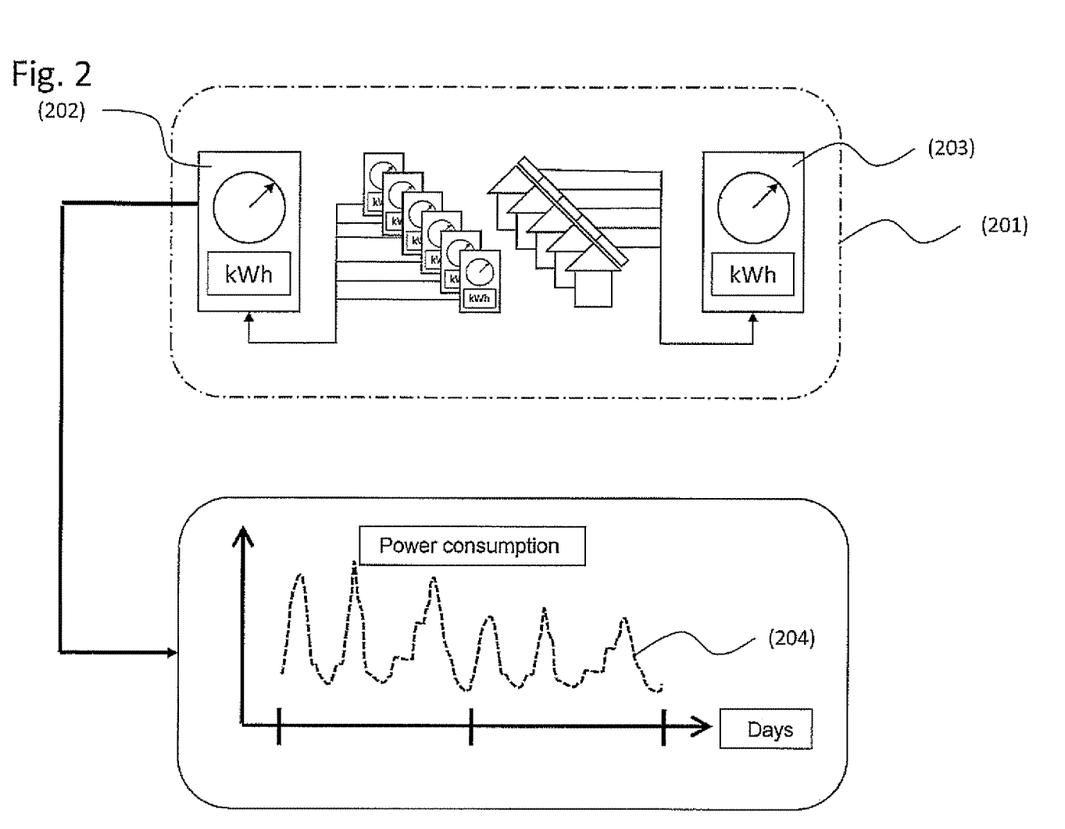
FIG. 2 shows a typical housing development and the temporal course of the power consumed in the housing development.

FIG. 2 shows a typical housing development and the temporal course of the consumed power of the housing development. A housing development (201) consists of one or more housing units (101). The one or more photovoltaic installation(s) of the housing development (201) are interconnected and the combined energy yield thereof is measured by a photocurrent meter (203). Optionally, the different yields of the individual photovoltaic installations of the housing development can be added together.

The total power consumption of all the housing units is detected by a housing development electricity meter (202). In another embodiment, it is possible to omit the housing development electricity meter (202) and to determine the overall power consumption of the housing development by adding together the different yields from the individual domestic meters (105) and additional shared electricity meters in the housing development. In the remainder of the description it will be assumed, but without restricting the generality, that the total of the power consumption of all the housing units and the shared power is detected by a housing development electricity meter (202).

Figure 5:
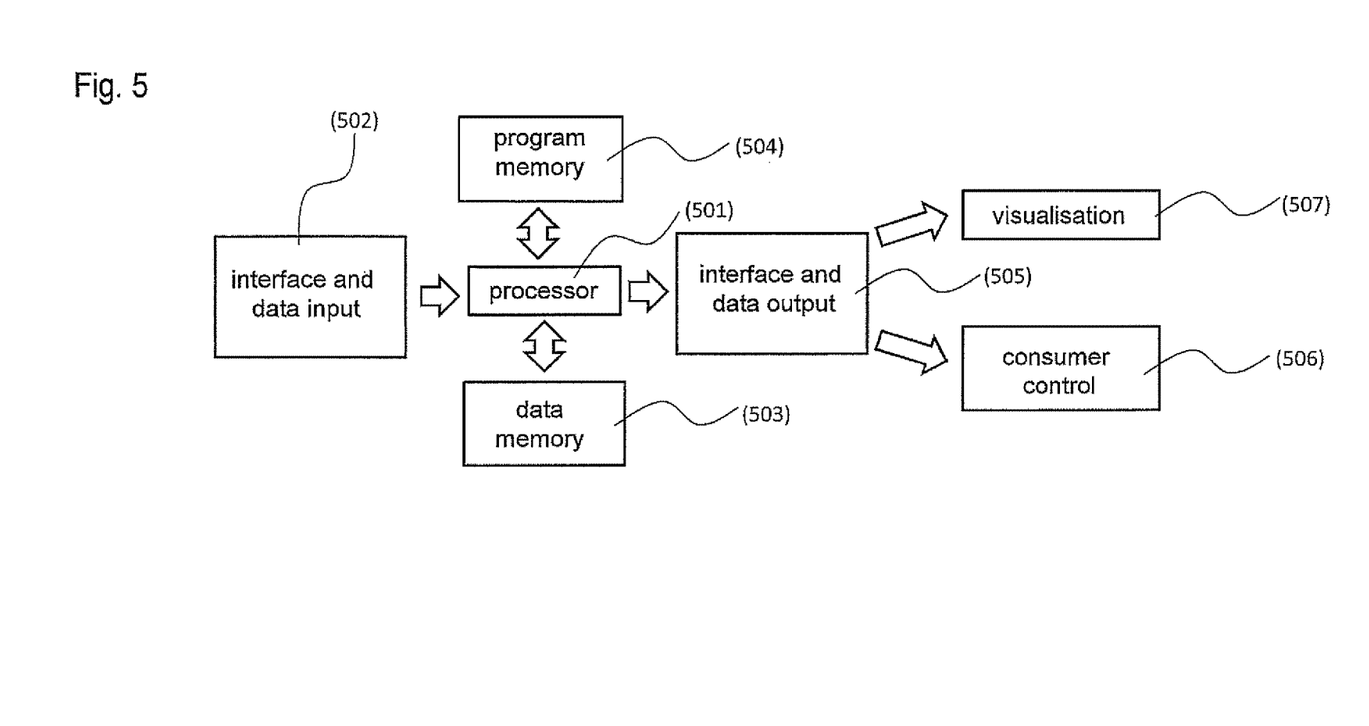
FIG. 5 is a block diagram showing an embodiment of a computer.

The housing development electricity meter (202) transmits the temporal course of the consumed power (204) to a processor (501) via an appropriate interface and data input (502) (cf. FIG. 5). The temporal course of the consumed power will also be referred to in the following as the load profile. The prediction according to the invention of a future load profile in the housing development is made by using historical, i.e. known, load profiles of the housing development.

The prediction is determined by assigning one or more characteristic variables to the known daily load profiles of the housing development, which variables can be at least approximately predicted and influence the load profile. This will be explained with reference to an example and FIG. 3.

Figure 3:
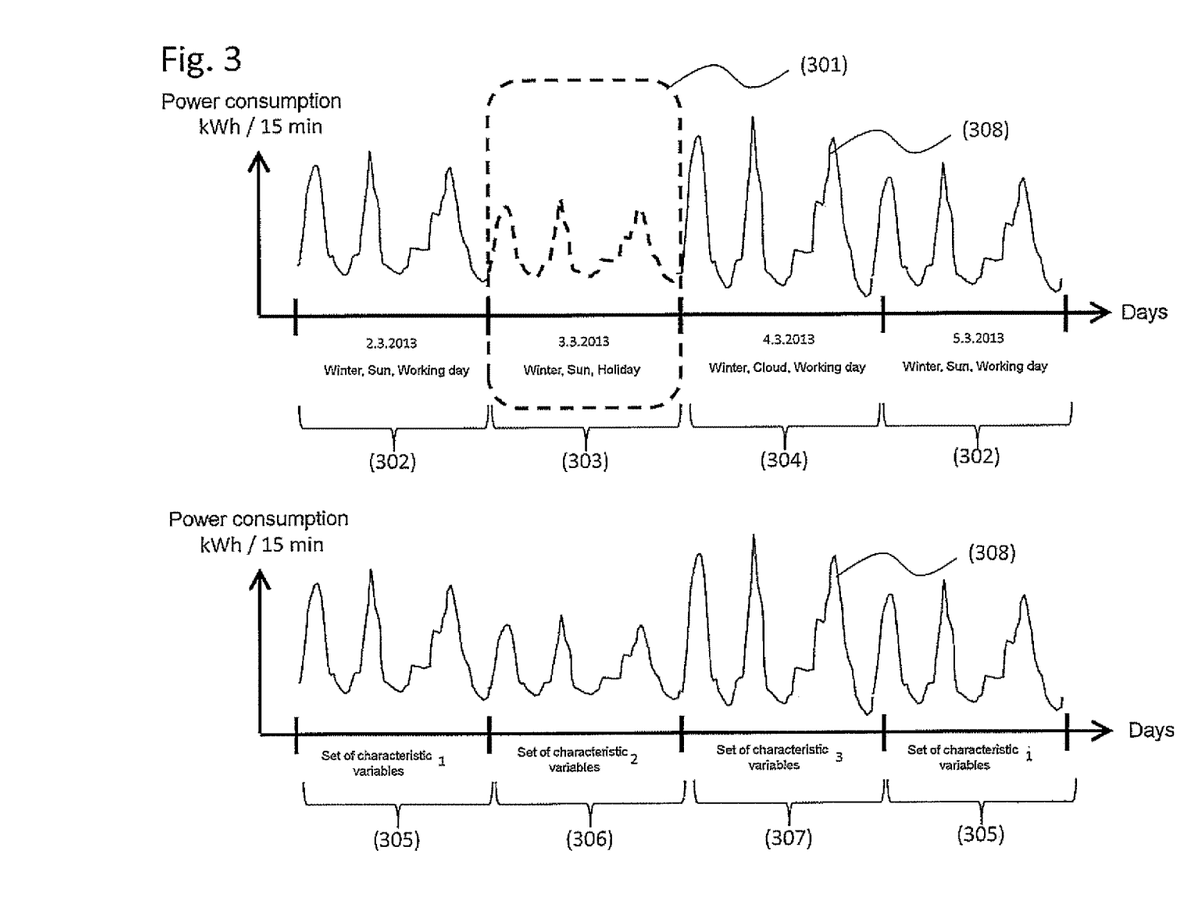
FIG. 3 is an example of how known daily load profiles of the housing development can be assigned one or more characteristic variables.

The known historical load profile of a housing development for the time period Feb. 3, 2013-May 3, 2013 (308), selected by way of example, is shown graphically as the energy consumption per 15 minutes. In this case, the power consumption values are shown for each 15-minute interval in this four-day period. This representation is by way of example. It is also possible to represent the temporal course of the energy consumption in other manners, for example by specifying the energy consumption for intervals that are shorter than 15 minutes or for intervals that are longer than 15 minutes, for example an hour.

In the load profile shown by way of example, the days (301) are assigned particular characteristic variables. Thus, for example, the day Feb. 3, 2013 is assigned the three characteristic variables winter, sun, working day (302).

Other days are generally assigned other characteristic variables, as shown in FIG. 3 (303), (304). The inventors have identified that the characteristic variables have to be selected such that they have a substantial influence on the load profile, can themselves be easily predicted at least approximately, and every combination thereof occurs sufficiently frequently throughout the course of the year. This is the case for the characteristic variables selected in (302)-(304): in total, there are 2×2×2=8 possible combinations of the characteristic variables summer/winter, working day/holiday, sun/cloud, which each form a set of characteristic variables (305)-(307), respectively.

The selected characteristic variables (302)-(304) are referred to as standard typical days and are known from VDI 4655 ["Referenzlastprofile von Ein-und Mehrfamilienhäusern für den Einsatz von KWK Anlagen", VDI Richtlinie VDI 4655, Mai 2008] (*"Reference load profiles of single and multiple-family homes for the use of CHP plants"*, Association of German Engineers (*VDI*) Guidelines VDI 4655, May 2008). It is expected that each of these combinations will occur sufficiently frequently during the course of the year. In addition, predicting the future characteristic variables is only affected by the uncertainty of the weather forecast (cloudy or sunny), and can be considered to be easily predictable at least approximately in view of the existing prior art for weather forecasting. In addition, the characteristic variables summer/winter, working day/holiday, sun/cloud have a substantial influence on the load profile.

Figure 4:
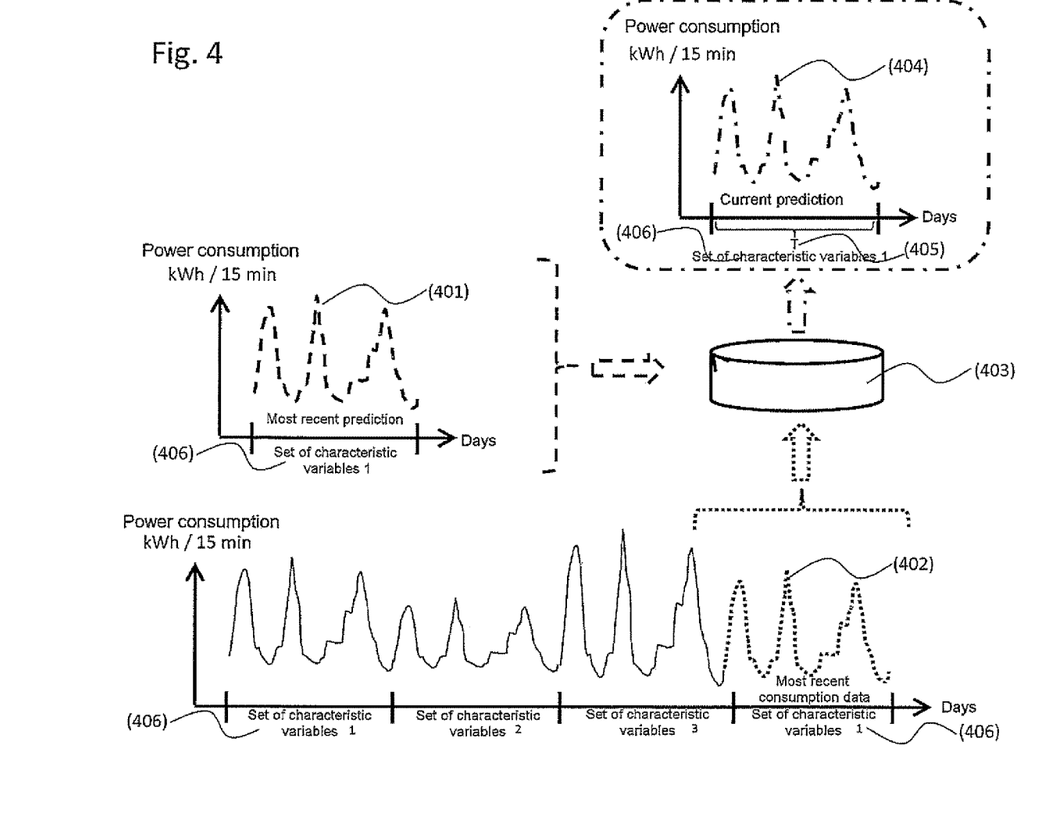
FIG. 4 shows how a prediction for a future load profile is made according to an embodiment of the invention.

FIG. 4 shows how a prediction of a future load profile is made according to an embodiment of the invention. Making a prediction (404) according to the invention for the future load profile in time period T (405) is done in such a way that suitable characteristic variables can first be determined. Said variables can be the above-mentioned standard typical days, for example. In a first step, the values for the characteristic variables for this time period T are then predicted.

In the example in FIG. 4, this is the set of characteristic variables 1 (406). By way of example, this set can be the values "winter-sun-working day" when typical days are selected as the characteristic variables.

The last prediction for a time period having this set of characteristic variables 1 is then identified (401). By way of example, this would be the last prediction having the values "winter-sun-working day". Furthermore, the last time period T having known consumption data for which the set of characteristic variables 1 applies is identified (402). By way of example, this would be the last consumption data having the values "winter-sun-working day".

These data of the last prediction (401) and the last known load profile (402) are routed to a computer (403) that calculates a current prediction (404) on the basis of these data.

The method according to which the computer determines this prediction can be individually optimised. The method can, for example, be selected such that the data of the last prediction (401) and the data of the last known load profile (402) are arithmetically averaged, by the values at each individual data point being added together and divided by two. However, the method can also be determined differently, and the data of the last prediction (401) can be weighted differently from the data of the last known load profile (402). It is possible, in this manner, to vary the amount by which the historical data used reach into the past: the higher the weighting of the data of the last prediction (401) compared with the weighting of the data of the last known load profile (402), the longer the reach into the past. It is advantageous to make the weighting variable and to continuously optimise said weighting such that the current prediction differs as little as possible from the actual consumption values.

The advantage of this method according to the invention consists in the fact that, unlike in the method according to VDI 6455 ["Referenzlastprofile von Ein-und Mehrfamilienhäusern für den Einsatz von KWK Anlagen", VDI Richtlinie VDI 4655, Mai 2008] ("*Reference load profiles of single and multiple-family homes for the use of CHP plants*", Association of German Engineers (*VDI*) Guidelines *VDI* 4655, *May* 2008), the prediction is specific to the conditions of an individual housing development. It should therefore be expected that a prediction according to the invention is more accurate than a prediction according to the prior art.

The selection of the characteristic variables is of particular importance. In a particular embodiment of the invention the typical days according to VDI 4655 are used for this purpose. In general, the invention does not comprise only the use of typical days according to VDI 4655 as characteristic variables, but rather characteristic variables more generally. The inventors have identified that the characteristic variables must be selected such that said variables have a substantial influence on the load profile, can themselves be easily predicted at least approximately, and every combination thereof occurs sufficiently frequently throughout the course of the year.

In another embodiment of the invention, characteristic variables derived from the outside temperature are used therefor by way of example. In a particular embodiment, the characteristic variables are selected as follows: "very cold"/temperature<−2°, "cold"/temperature of between −2° and 5°, "average"/temperature of between 5° and 10°, "warm"/temperature of between 10° and 20°, and "very warm"/temperature>20°. Characteristic variables of this kind can be easily predicted and meet the above-mentioned criteria.

In another embodiment of the invention, characteristic variables can be selected, for example, depending on the number of people living in the housing development. The number of people registered as living in a specific housing development will vary over the course of the year, depending on whether some residents are on holiday or whether guests are visiting the housing development, etc. Since the power consumption in general depends on the number of people living in a housing development, including the number of people living in the housing development in the prediction of the power consumption will increase the accuracy thereof. The number of people living in a housing development can be predicted, for example, in that the residents provide information about this themselves and make corresponding data available to the computer (403).

In practice, however, some residents of the housing development will not provide information of this kind. The inventors have identified that, in this case, a prediction of the number of people living in a housing development can be made by analysing non-electrical consumption data. The inventors have additionally identified that for example the number of times toilets are flushed in a day closely correlates with the number of people living in a housing development, and that the number of times toilets are flushed can in turn be estimated by analysing the temporal water consumption.

The inventors have further identified that another expedient non-electrical consumption variable is, for example, heat consumption, or the temperature in a housing unit or in a particular room of the housing unit. The inventors have identified that the temporal heat consumption or the temperature can be correlated with the number of residents in a housing unit. It has been found that residents reduce the target temperature before leaving their home for a long period, and therefore the number of residents can be concluded from the measured temperature or from the measured heat consumption. It has further been found that the unknown power consumption can also be concluded directly from the predictable temporal heat consumption or the predictable temperature, and therefore characteristic variables derived from the temporal heat consumption or the temperature can be used.

In an embodiment, the temperature of the living room is measured and classified for each housing unit: "T low"="living room temperature as the daily mean of the past 24 hours<15°" and "T high"="living room temperature as the daily mean of the past 24 hours>15°". In the case of "T low", it is to be expected that no residents are present in the housing unit, and it is possible to predict that this is very likely to also be the case in the near future. It is therefore possible to modify the prediction of the power consumption of the housing development to the effect that a correspondingly lower household power is predicted for the uninhabited housing unit(s).

Figure 6:
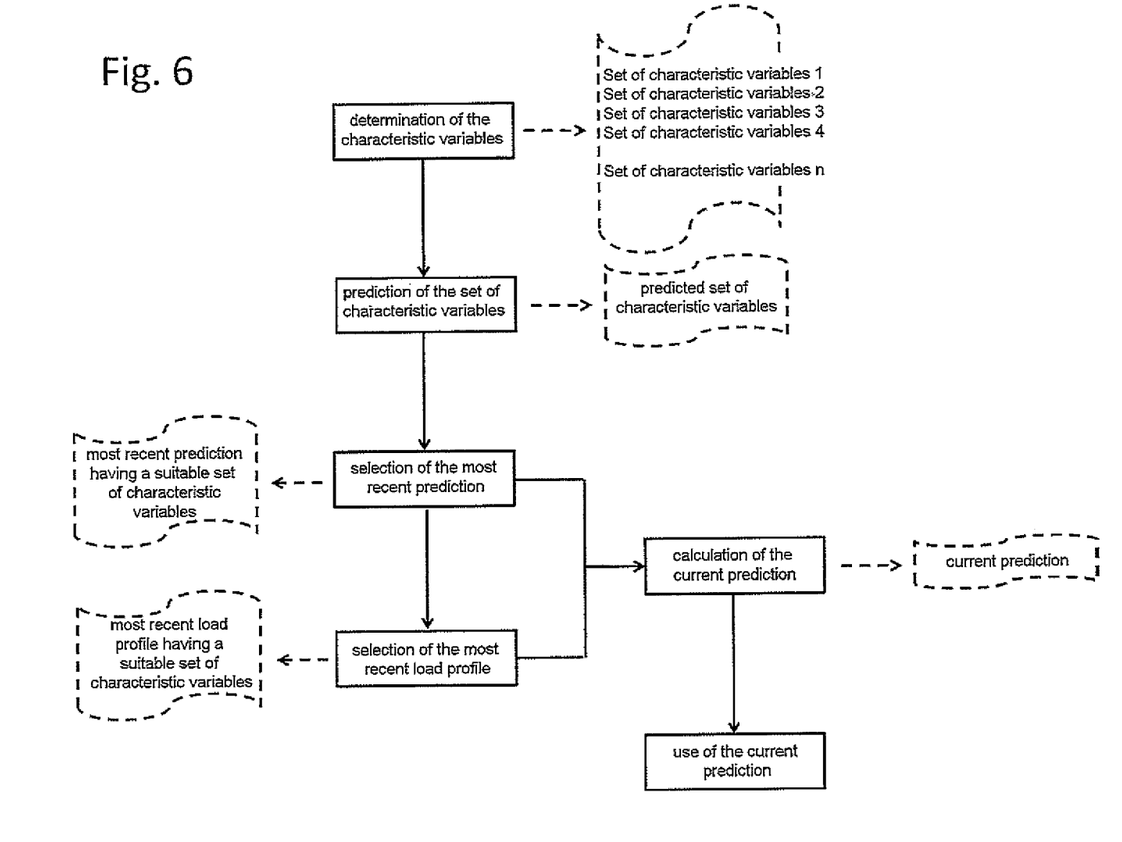
FIG. 6 shows how a prediction for a future load profile is made according to another embodiment of the invention.

The prediction is made for each housing unit using the method shown in FIG. 6. In this embodiment, the prediction is made for each housing unit of the housing development. The temperature having the two possible values "T high" and "T low" is used as the characteristic variable. The prediction of the power consumption of the entire housing development results in this embodiment by adding together the predictions of all the housing units in the housing development.

The inventors have found that the accuracy of the above-described prediction method can be further improved in housing developments having a current-fed heat supply if the overall power consumption of the housing development is divided into two portions and these two portions are predicted separately: one portion for the heat energy generation, and another portion for all the other power consumers in the housing development. In a particular embodiment of the invention, the prediction is thus made in parallel and independently for the two portions "power for heat generation" and "remaining power". In this case, the prediction of the "remaining power" is made according to the method described above (FIG. 6). The prediction of the "power for heat generation" can also be made according to the method described above (FIG. 6). However, said prediction can also be made by means of a direct calculation without consulting historical data, for example using climatic data and building simulation. The overall power consumption is then the sum of the two portions.

FIG. 5 is a block diagram showing an embodiment of a computer (403). Said computer comprises a processor (501). The processor (501) executes program statements for example, which are stored in the program memory (504), and stores for example intermediate results or the like in the data memory (503). The program memory (504) and/or the main memory (503) can be used by the processor (501) for storing data such as prediction data (401) or consumption data (308), (402).

Program statements that are stored in the program memory (504) relate in particular to determining at least one of the predictions mentioned. The program statements can be contained in a computer program, for example, which is stored in the program memory (504) or has been loaded into the program memory (504), for example by a computer program product, in particular a computer-readable storage medium, or via a network.

The processor (501) contains data regarding the interface and data input (502). The data are for example consumption data (308), (402) or prediction data of characteristic variables (302)-(307). The processor (501) generates new data and outputs these data via the interface and data output (505).

The output data are for example visualised/displayed (507) and/or forwarded to a consumer control (506). A consumer control (506) of this kind can for example use the current prediction data in order to connect power consumers in such a way that the lowest possible power costs are incurred.

The invention claimed is:

1. A method for predicting the temporal course of a power requirement in a housing development comprising a plurality of housing units each comprising a plurality of power consumers, wherein the housing development has a common power supply that is subject to a temporally variable tariff, the method comprising: (a) wherein a prediction of the power consumption of the housing development for a future time period having a specified duration is made and continuously updated by a computer, wherein a load transfer for reducing power costs can be determined on the basis of a current prediction of the power consumption; (b) wherein the computer uses, for each prediction of the power consumption, data of detected load profiles of the housing development, the data formed by detecting the temporal course of the overall power consumption of the housing development in a prior time period having the specified duration by means of an electricity meter of the housing development; (c) wherein a current prediction of the power consumption for the future time period having the specified duration is calculated by the computer on the basis of a previous prediction of the power consumption over the prior time period having the specified duration and data of a previously detected load profile detected over the prior time period having the specified duration, and wherein the current prediction of the power consumption for the future time period having the specified duration and/or the data of the previously detected load profile are forwarded by the computer to a consumer control of the housing units and are displayed; (d) wherein the computer assigns to the predictions and the detected load profiles, as a set of characteristic variables, one or more characteristic variables, in which predictions of the set of variables are known and in which the set of variables have an influence on the load profiles, and the computer calculates the current prediction of the power consumption for the future time period having the specified duration on the basis of a previous prediction of the power consumption having the same set of characteristic variables and on the basis of only one previously detected load profile having the same set of characteristic variables; (e) wherein the current prediction of the power consumption for the future time period having the specified duration and/or the data of the previously detected load profile are used in the consumer control for connecting one or more power consumers such that their operating time point is determined in such a way that they operate at times when the electricity tariff is as low as possible; (f) wherein in step (c), first values for the characteristic variables for the future time period having the specified duration are predicted, then a last prediction of the power consumption for a prior time period having this set of characteristic variables is identified, a last prior time period having known consumption data for which the set of characteristic variables applies is identified, and then the data of the last prediction of the power consumption and the last known load profile are routed to the computer that calculates the current prediction of the power consumption on the basis of these data; (g) wherein a previous prediction of the power consumption includes a most recently made prediction for the set of characteristic variables, and the previous load profile is a most recently detected load profile for the set of characteristic variables; and (h) wherein the current prediction of the power consumption for the future time period having the specified duration is calculated such that the previous prediction of the power consumption and the data of the previously detected load profile are variably weighted and added together.

2. The method according to claim 1, characterized in that the common power supply is subject to a mixed tariff that comprises different tariff components corresponding to different power supply components.

3. The method according to claim 2, characterized in that daily load profiles of the housing development are detected and are used as a typical-day characteristic variable, as defined by VDI 4655.

4. The method according to claim 2, characterized in that a characteristic derived from the outside temperature is used as the characteristic variable.

5. The method according to claim 2, characterized in that a characteristic derived from the number of people living in the housing development is used as a characteristic variable.

6. The method according to claim 2, characterized in that a number derived from a non-electrical measurement or consumption value of the housing development is used as a characteristic variable.

7. The method according to claim 2, characterized in that the characteristic variable is derived from a temporal course of a water consumption and/or a heat consumption of the housing development.

8. The method according to claim 2, characterized in that a characteristic variable is derived from temperatures in the housing units of the housing development.

9. The method according to claim 1, characterized in that a separate prediction is made for the power required for generating heat energy.

10. A computer program to be executed by a computer processor comprising program statements, wherein the program statements cause a processor to carry out the method according to claim 1 when the computer program is executed by the computer processor.

11. An apparatus for predicting the temporal course of a power requirement in a housing development comprising one or a plurality of housing units each comprising a plurality of power consumers, wherein the housing development has a common power supply that is subject to a temporally variable tariff the apparatus comprising: a computer configured and operable to; (a) make and continuously update a prediction of the power consumption of the housing development for a future time period having a specified duration, wherein a load transfer for reducing power costs can be determined on the basis of a current prediction of the power consumption; (b) use each prediction of the power consumption data of detected load profiles of the housing development that are formed by detecting the temporal course of the overall power consumption of the housing development in a prior time period having the specified duration by means of an electricity meter of the housing development; (c) calculate a current prediction of the power consumption for the future time period having the specified duration on the basis of a previous prediction of the power consumption for a prior time period having the specified duration and data of a previously detected load profile for a time period having the specified duration, and transmit the current prediction for the future time period having the specified duration and/or the data of the previously detected load profile to a consumer control of the housing units and displays the current prediction and/or the data of the previously detected load profile; and (d) assign to the predictions and the detected load profiles, as a set of characteristic variables, one or more characteristic variables, in which predictions of the one or more characteristic variables are known and which have an influence on the load profiles, and calculates the current prediction for the future time period having the specified duration on the basis of a previous prediction of the power consumption having the same set of characteristic variables and on the basis of only one previously detected load profile having the same set of characteristic variables; wherein the current prediction of the power consumption for the future time period having the specified duration and/or the data of the previously detected load profile are used in the consumer control for connecting one or more power consumers in such a way that their operating time point is determined in such a way that they operate at times when the electricity tariff is as low as possible; wherein in item (c) in a first step, the characteristic variables for the future time period having the specified duration are predicted, then the last prediction of the power consumption for a prior time period having this set of characteristic variables is identified, furthermore, the last time prior period having known consumption data for which the set of characteristic variables applies is identified, and the data of the last prediction and the last known load profile are routed to the computer that calculates the current prediction of the power consumption on the basis of these data; wherein a previous prediction of the power consumption includes a most recently made prediction for the set of characteristic variables, and the previous load profile is a most recently detected load profile for the set of characteristic variables; and the current prediction for the future time period having the specified duration is calculated in such manner that the previous prediction of the power consumption and the data of the previously detected load profile are variably weighted and added together.

\* \* \* \* \*

UNITED STATES PATENT AND TRADEMARK OFFICE
CERTIFICATE OF CORRECTION

| | | |
|---|---|---|
| PATENT NO. | : 11,195,105 B2 | |
| APPLICATION NO. | : 15/324428 | |
| DATED | : December 7, 2021 | |
| INVENTOR(S) | : Heinze Hanen et al. | |

It is certified that error appears in the above-identified patent and that said Letters Patent is hereby corrected as shown below:

On the Title Page

Item (73), Assignee:
Replace "EVOHAUS GMBH" with -- EVOHAUS IRQ GMBH --

Signed and Sealed this
Thirty-first Day of January, 2023

Katherine Kelly Vidal
*Director of the United States Patent and Trademark Office*